Aug. 27, 1968     W. J. BLOOMER     3,398,574
CLOSURE CAP INSPECTING APPARATUS
Filed Feb. 20, 1967     2 Sheets-Sheet 2
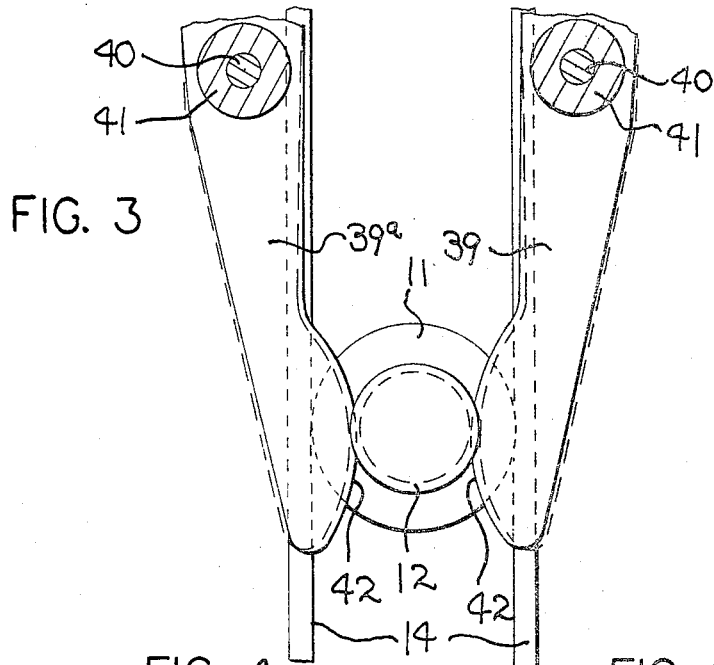
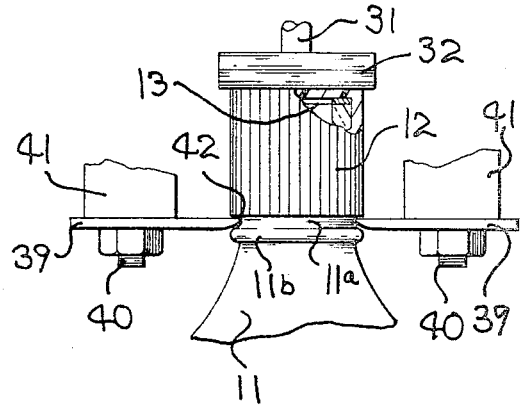
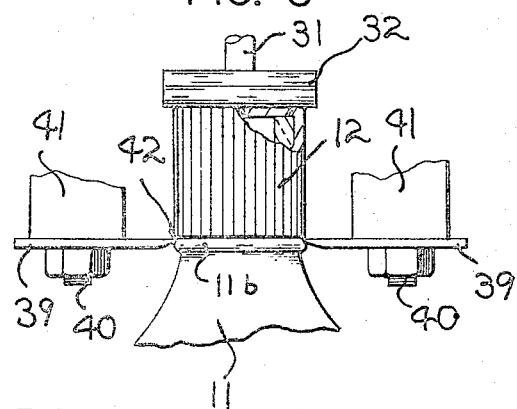
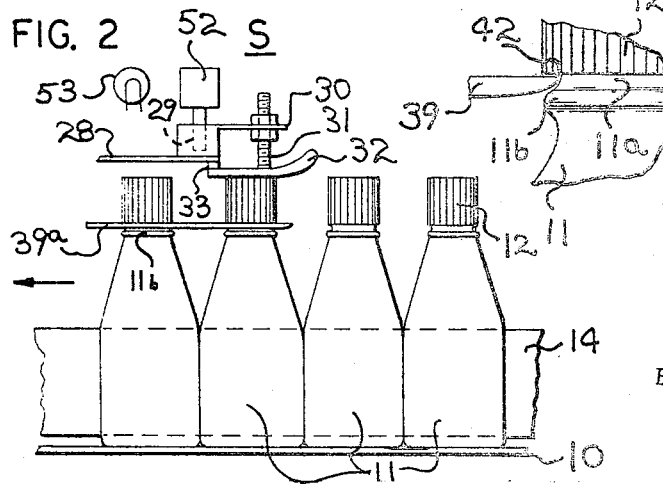
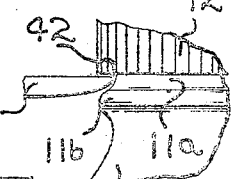
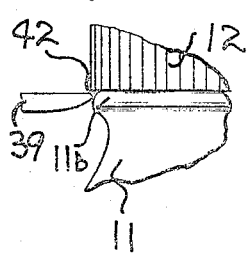
INVENTOR.
WILLIAM J. BLOOMER
BY
J. R. Nelson and W. A. Schaich
ATTORNEYS United States Patent Office 3,398,574
Patented Aug. 27, 1968

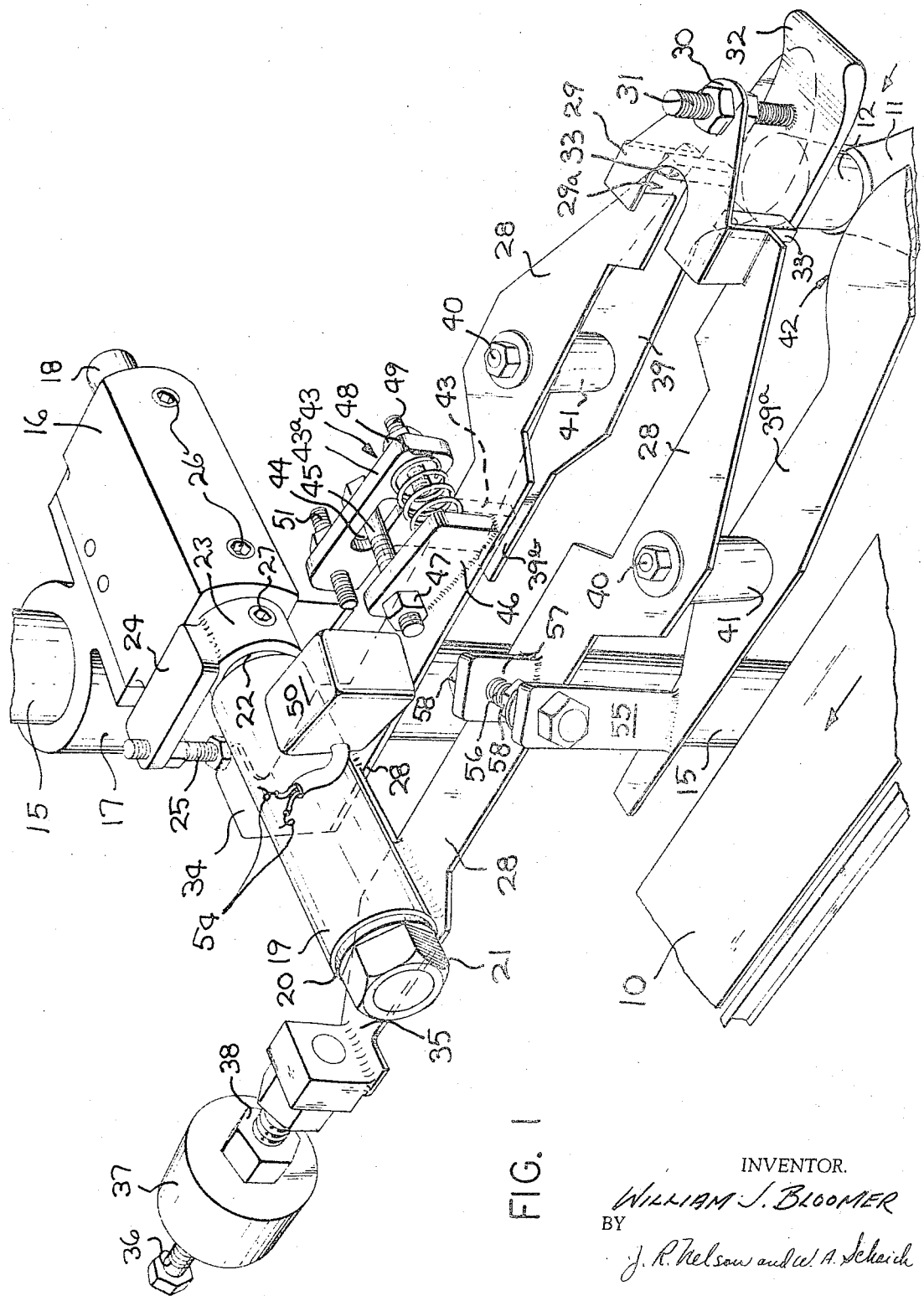

3,398,574
CLOSURE CAP INSPECTING APPARATUS
William J. Bloomer, Toledo, Ohio, assignor to Owens-Illinois, Inc., a corporation of Ohio
Filed Feb. 20, 1967, Ser. No. 617,237
10 Claims. (Cl. 73—52)

ABSTRACT OF THE DISCLOSURE

An apparatus for detecting and indicating the absence of a gasket liner element in a closure cap that is assembled onto a bottle in closing its contents. The apparatus employs a movable sensing arm to determine elevation location of the cap bottom with respect to a transfer bead on the neck of the glass bottle, as the bottle is moved upright on a horizontal conveyor. The movable sensing arm is in a position for engagement with both the lower end of a cap and the bead if an ungasketed cap is on the bottle, by reason of its being telescoped on the bottle to a lower level than a gasketed cap. This engagement of the arm with the cap and bead moves the latter to activate a switch for operating a cap marking device, and illuminating a signal lamp or like device, either or both of which signify the assembly as a "dud."

---

My invention is a novel apparatus for detecting the absence of a sealing ring or liner from a closure cap following its application to a container and while the latter is moving along a conveyor to a cartoning station or other destination.

Closure caps for bottles and similar containers ordinarily are provided with sealing rings or liners, such being generally essential to effect satisfactory sealing of the containers. From time to time these rings or liners become displaced during general handling and hoppering, with the result that on occasion a closure cap minus its sealing ring or liner is applied to a container. Such of course, can result in product spoilage, leakage and if the defective container is undetected and is cartoned, other containers may well be detrimentally affected at least as regards appearance and marketability. The dollar loss, and inconvenience, therefore may well be substantial, as is appreciated.

An important object of my invention therefore is the provision of simple reliable means for detecting containers closed with unlined closure caps, as they travel along a conveyor and indicate their presence to an operator.

Another object of my invention is the provision of novel apparatus in part overlying the path of travel of capped bottles and operable in response to an abnormally low position of a closure cap on a bottle, because of the absence of a sealing ring or liner therein, to actuate a signal informing an operator of the presence of a defective closure.

It is also an object of my invention to provide in apparatus of the above character means whereby it may be utilized in connection with bottles and closure caps varying both in height and diameter.

Other objects will be in part apparent and in part pointed out hereinafter.

In the accompanying drawings forming part of my application:

FIG. 1 is a perspective view showing my "no-liner" detecting apparatus positioned over a bottle conveyor.

FIG. 2 is a fragmentary side elevational showing several capped bottles on a conveyor for inspection by my invention.

FIG. 3 is a fragmentary plan view showing the relationship between the sensing arms of my invention and a closure cap.

FIG. 4 is a fragmentary elevational view partly in section, showing a gasketed closure cap on a bottle in relation to the sensing arms.

FIG. 5 is an enlarged fragmentary elevational view illustrating the normal relationship between the sensing arm or lever and closure cap properly gasketed.

FIG. 6 is a view similar to FIG. 4 but with the closure cap ungasketed, resulting in lowering the position of both the cap and sensing assembly and actuation of the latter.

FIG. 7 is a view like FIG. 5, but with the signal control sensing lever shifted laterally to close a signal control microswitch.

In the illustrated embodiment of my invention it is associated with a horizontal conveyor 10 which preferably moves continuously to bring upright capped bottles 11 in succession to an inspecting station where my invention functions to ascertain whether the closure caps 12 have sealing rings 13 or liners. Guide rails 14 (FIGS. 2 and 3) function to accurately position the bottles on the conveyor in relation to the inspecting apparatus embodying my invention. This apparatus operates in response to abnormal positioning of the closure caps on their bottles, in that the absence of a sealing ring from a closure cap allows it to telescope further onto its bottle. With the closure cap in an abnormally low position (FIGS. 6 and 7) its attaching skirt closes or at least greatly reduces the width of the channel 11a just above the annular bead 11b, thereby causing the sensing arm 39 or lever to move about its pivot 40 and operate a signal control microswitch 50. On the other hand, if the closure cap is properly lined or gasketed, it will be positioned at such level that the sensing lever will not move on its pivot.

My inspecting apparatus overlies the conveyor 10 and is mounted for vertical adjustment on an upright column 15, or post, positioned at one side of said conveyor. Thus, the apparatus may be set at the level indicated by the height of the bottles and closure caps involved. The apparatus comprises a bracket 16 extending horizontally from a sleeve 17 through which it is mounted on said post 15. This bracket 16 supports a fixed horizontal rod 18 which extends transversely across the conveyor and through a sleeve 19. This sleeve is oscillatable on the rod, being secured against axial movement thereon by washers 20 and a nut 21 at its outer end. The vital parts of the inspecting apparatus are mounted on this sleeve, as will be apparent presently. A fixed ring 22 abuts the inner end of this sleeve. Between this ring and the bracket 16 is a collar 23 carrying an arm 24 which in turn supports a vertically adjustable stop-screw 25, the function of which will be explained presently. Set-screws 26 secure the rod 18 against movement in the bracket and a single set-screw 27 locks the collar 23 to the rod 18.

A pair of parallel, generally horizontal arms 28, comprising a main frame are welded or otherwise connected near one end to the lower side of the sleeve 19. These arms overlie the conveyor and at their free end are interconnected by a cross-bar 29 having a cut-out 29a to accommodate a cap marking device to be described hereinafter. This cross-bar has a forward extension 30 in which a shoe supporting screw 31 is mounted. The shoe 32 may be welded to the lower end of the screw 31 (FIG. 1) and provided with slide members 33 riding against portions of the cross-bar 29. This shoe is intended to ride upon the panels of applied closure caps as the involved bottles 11 approach the inspecting station and functions to steady the bottles and establishes a reference point for the sensing levers, without regard to bottle height variation. One of these arms has a finger 34 beyond the horizontal pivot point positioned directly beneath and for engagement with the stop-screw 25. The position of this screw of course determines the precise level of the shoe 32. Thus, it provides "fine" adjustment of the shoe level. The other arm 28 has an extension 35 beyond the sleeve 19 including a counter weight supporting rod 36, the counter weight 37 being adjustable along the rod and secured in any preferred position by one or more lock-nuts 38. As is apparent, this counter weight functions to counterbalance the weight of the arms 28 and elements carried by them. These arms 28 carry two sensing levers 39 and 39a positioned to be actuated by unlined, applied closure caps, as will be explained.

Although these sensing levers may assume any of various specific forms, such as stiff wire sections, or feeler arms, and may of course be of metal or plastic material, I have for illustrative purposes shown these levers as being of metal and rather substantial dimensionally. These levers are flat elongated strips placed one below each of the main supporting arms 28 to which they are pivoted by vertical pivot pins 40 or bolts. Spacers 41 hold the arms 28 and levers 39 and 39a in proper spaced relationship. These sensing levers are arranged one at each side of the line, or path, of travel of the bottles (FIGS. 1 and 3). The inner margin of the forward end of each sensing lever may well be curved and beveled on its lower side substantially the entire length of the curved area (FIGS. 3 and 4) to present a comparatively sharp, or knife-like, edge 42 for contact with the extreme lower portion of closure caps, at diametrically opposed points, under conditions to be explained presently. These sensing levers 39 and 39a and the shoe 32 are so vertically spaced apart through adjustment of the shoe that if the closure cap 12 of a bottle moving through the inspecting station S, is properly lined (FIGS. 4 and 5) the shoe will slidingly contact the top wall or panel of the cap while the flat top surface of the sensing levers 39 will just clear the bottom edge of the clousre cap skirt and at least one of these levers 39 and 39a has its curved edge portion 42 yieldingly engaged with the bottle neck just below the cap.

Such engagement, I obtain by means of a spring device comprising a generally T-shape bracket 43 rising from the rearmost end 39b of one of the sensing levers (FIG. 1). The head portion 43a of this bracket has a horizontal slot 44 to accommodate the headed end of a connection bolt 45 which extends through an upstanding finger 46 on the arm 28. Adjustment of the nut 47 on the bolt 45, as will be apparent predetermines the innermost position of the corresponding knife-edge 42, such being determined by the bottle neck and closure cap diameter. An expansion coil spring 48 positioned between the bracket 43 and finger 46 and carried by a bolt 49 or pin urges these elements apart and yieldingly presses the curved edge 42 inwardly toward the row of bottles. A microswitch 50 on this particular arm 28 is actuated at times by a finger in the form of a screw or bolt 51 threaded through that end of the bracket head remote from the spring 48. This finger is adjustable, as may be required, to insure satisfactory actuation of the microswitch. A lock-nut secures the finger in any adjusted position. This switch, under certain conditions to be explained, actuates both a cap marking device 52 (FIG. 2) and a signal lamp 53 to which it is connected by lines 54.

Although both sensing levers could be equipped as above indicated, I prefer having the second arm 39a fixed against movement on its pivot pin 40 except to the extent it requires adjustment as to lateral position to accommodate bottles and caps of different diameter. Thus, this lever 39a is a bottle steadying bar. To this end a bracket 55 rises from the sensing lever 39a and carries a bolt 56 which couples said bracket to an upstanding finger 57 on the corresponding arm 28. Nuts 58 on this bolt 56 function to adjust the position of the lever 39a and lock it wherever conditions require.

In operation, capped bottles 11 move seriatim along the conveyor 10 between the guide-rails 14 to the inspecting station S where the neck portions and/or closure caps enter and advance through the space between the two curved knife-like edges 42 of the sensing levers 39 and 39a. If, as in FIGS. 4 and 5, the closure caps contain sealing rings 13 their lower ends will be at an elevation to clear both sensing levers. Consequently, bottles so capped move along the conveyor freely and do not shift the sensing lever 39. If however (FIGS. 6 and 7), the sealing ring or liner has fallen out of the cap, such cap will telescope further onto the bottle and at least in part close the channel 11a, causing outward movement of the spring pressed lever 39 on its pivot and closing the microswitch 50. This causes operation of the marking device 52 and lighting of the signal lamp 53, informing the operator of the presence of an unsealed bottle. The other lever 39a functions as a back-up or steadying bar or rail. Moreover, if preferred, this second lever 39a, merely through changing the length of its pivot pin 40 and sleeve 41, may be placed at a level to contact either the glass or the side wall of the closure caps. As is apparent the lateral position of this lever, or steadying bar, is adjustable to compensate for differences in the bottle or closure cap diameter. The bolt 56 and nuts 58 thereon provide the means for adjusting this bar 39a.

Modifications may be resorted to within the spirit and scope of the appended claims.

I claim:

1. In apparatus for detecting and indicating the absence of sealing elements from the interior of skirted closure caps that have been telescoped over and secured to the necks of containers, means for conveying such capped containers upright along a horizontal path to and beyond an inspecting station with the free lower edge of the skirt at one level if the caps are gasketed and at a lower level if not gasketed, a movable sensing lever positioned over said path just below the level of said free lower edge of the skirt of a gasketed closure cap but in a position to engage and be moved in response to contact with the lower edge of the skirt of an ungasketed closure cap and adjacent portions of the container and means operable in response to a predetermined degree of movement of the lever as a result of such contact for indicating the presence of an ungasketed closure cap.

2. In apparatus as defined in claim 1, the sensing lever having an end shiftable laterally toward and away from containers advancing along said path, means yieldingly urging the lever toward the containers, and means at said station for holding the containers against bodily lateral shifting under pressure of said sensing lever.

3. In apparatus of the character defined in claim 1, a shoe beneath and in contact with which containers travel through the inspecting station and a back-up bar at said station at that side of the containers opposite the sensing lever to stabilize such containers during inspection.

4. In apparatus as defined in claim 1, the sensing lever being pivoted for horizontal movement at one side of the path of the containers, spring means yieldingly urging one end of the lever toward and into contact with containers at said station, and a container steadying back-up bar opposite the sensing lever at said station.

5. In apparatus as defined in claim 1, the last-named means being an electric switch closable by predetermined degree of movement of said lever, and a marker operable in response to closing of the switch for visibly marking a closure cap.

6. In apparatus as defined in claim 3, means for adjusting the elevation of the shoe to accommodate containers of different height, and means for setting the sensing lever and back-up bar at different levels.

7. In apparatus of the character described, a generally horizontal elongated main frame comprising a pair of arms mounted for limited vertical movement on a pivot near one end of the frame, a shoe support at the free end of said frame interconnecting the arms, a shoe suspended from said support, a sensing lever suspended from one arm for lateral movement relative to the arm, a back-up bar suspended from the other arm opposite said lever, means for setting said bar in different positions relative to the sensing lever, means yieldingly urging the sensing lever toward the back-up bar, a microswitch closable by a predetermined degree of movement of the lever away from the back-up bar, and visual signal means operable by closing of the switch.

8. In apparatus as defined in claim 7, the last-named means including an article marking device.

9. In apparatus as defined in claim 7, the sensing lever being pivoted to a vertical hinge pin depending from the arm, and the means yieldingly urging the lever toward the back-up bar being a coil spring positioned between a pair of brackets on the sensing lever and its supporting arm.

10. In apparatus as defined in claim 9, the signal means including an article marking device.

References Cited

UNITED STATES PATENTS 3,313,409   4/1967   Johnson.

DAVID SCHONBERG, *Primary Examiner.*

J. NOLTON, *Assistant Examiner.*